July 14, 1931.  M. B. DU PONT  1,814,672
COLOR PHOTOGRAPHY
Filed Jan. 18, 1926    2 Sheets-Sheet 1
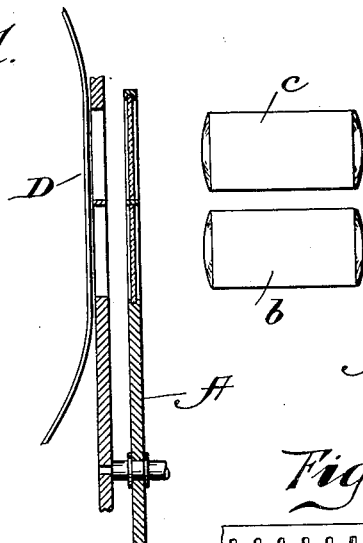
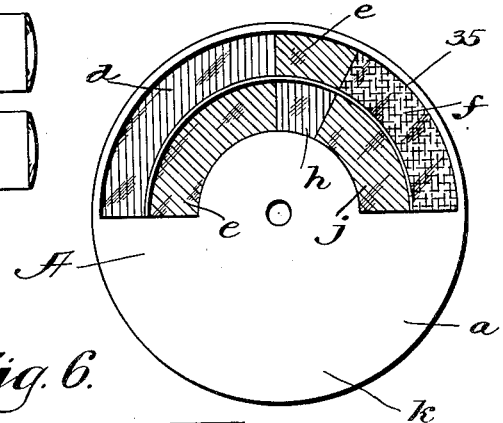
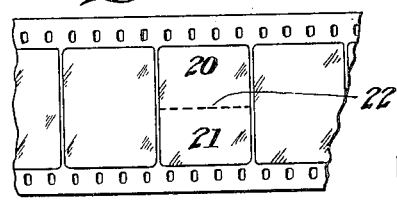
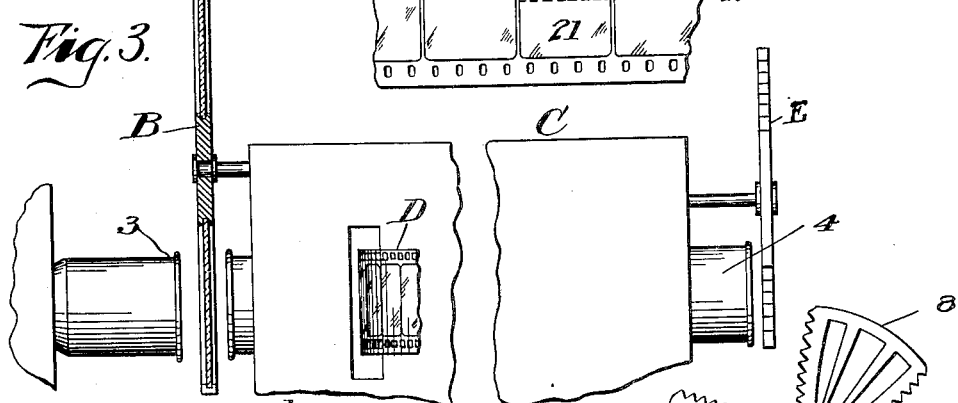
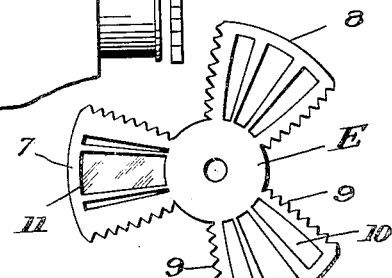
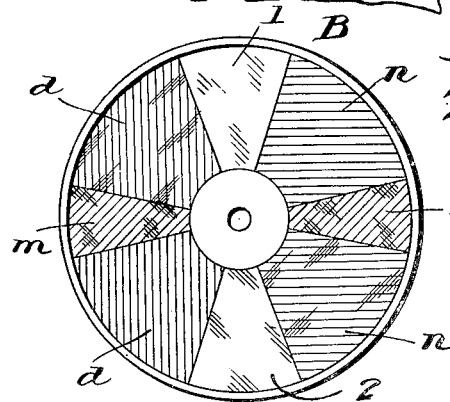
INVENTOR,
Max B. Du Pont;
BY Blakeslee & Brown
ATTORNEYS.

July 14, 1931. M. B. DU PONT 1,814,672
COLOR PHOTOGRAPHY
Filed Jan. 18, 1926 2 Sheets-Sheet 2
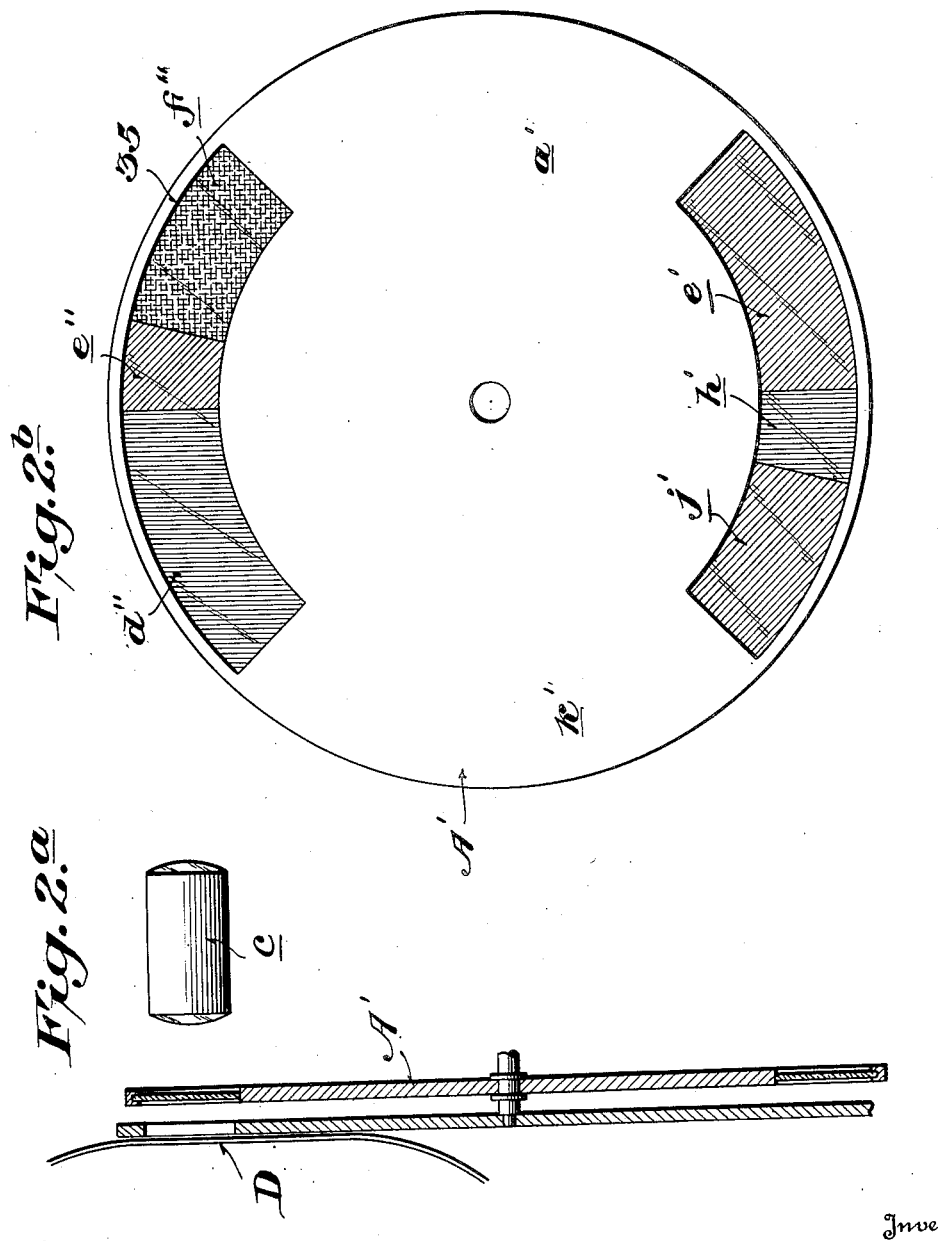
Inventor
Max B. Du Pont,
By Blakeslee & Brown
Attorney
WITNESSES:

Patented July 14, 1931

1,814,672

UNITED STATES PATENT OFFICE

MAX B. DU PONT, OF LOS ANGELES, CALIFORNIA, ASSIGNOR TO MAX B. DUPONT VITA-COLOR CORPORATION, OF LOS ANGELES, CALIFORNIA, A CORPORATION OF DELAWARE

COLOR PHOTOGRAPHY

Application filed January 18, 1926. Serial No. 81,992.

This invention relates to the art of color photography and has for its primary object the preservation and re-creation ultimately upon a screen of the original color values of the object being photographed.

In that connection the invention contemplates a process of color photography and projection upon a screen in color whereupon and whereby no disagreeable fringe effects are reproduced. Furthermore, the present method eliminates the disagreeable flicker or pulsation of colored motion pictures and at the same time produces a marked stereoscopic effect of the pictures thrown on the screen.

Another and important object of the invention is the provision of a color photography process wherein and whereby pictures may be taken with good results even on cloudy days or in very faint light.

That is to say, the invention contemplates a process or method whereby color photography is made practical under the same conditions that black and white pictures are taken with extraordinary results under the conditions set forth. Also, the present process does not require any special kind of light or lighting conditions such as is required in one of the best known color photography methods in use today.

A further object of the invention is to provide a process which is relatively inexpensive as compared with processes heretofore employed and as a matter of fact places color photography substantially on the par with the taking of ordinary black and white pictures.

In the drawing:

Figure 1 is a fragmentary cross sectional view showing two lenses adapted to register values on two panels of a film simultaneously;

Figure 2 is a plan view of a filter member which I may use in the taking of colored pictures;

Fig. 2ª is a detail view of a single lens adapted to operate in conjunction with a modified form of shutter.

Fig. 2ᵇ is a plan view of another arrangement of filter screens in a rotating shutter.

Figure 3 is a fragmentary and partially sectional view of a projection machine showing a filter device embodying my invention in place;

Figure 4 is a plan view of a filter which may be used with the projection machine;

Figure 5 is a plan view of shutter mechanism for the projection machine; and

Figure 6 is a plan view of a strip of film.

Corresponding parts in all the figures are designated by the same reference characters.

Heretofore, so far as I am aware most color photography has not given a true color effect when re-created upon the screen, and has at best, barely approximated the original object photographed from the color standpoint for the reason that the true colors of the object being photographed have not been properly impressed or recorded on the film largely due to over correction. Most color processes using panchromatic films have greatly exaggerated the colors registered with the particular filter combination used, and, to overcome such exaggerations filters have been equipped with different forms of slots to admit white light to increase exposure of one frame, or, opaque masks to reduce the exposure on the succeeding frame. This system reduced the average time of exposure and as a result a given scene could only be photographed in certain ideal light conditions such as bright sunlight. If it were necessary to take a picture by artificial light or in dim or faint light or in the shade, such a process would be impractical. This crude method of balancing exposure limits the scope of color transmission and admits unnecessary and irritating white rays which should be produced by the combination of the three primary colors of the additive process, namely red, blue and green.

Prior investigators in color photography have had only the balancing exposure in mind and have neglected to take into consideration that balancing is not the only factor necessary to transmission of true color sensations to the human eye. It is also necessary, and of prime importance, to admit all of the components of the spectrum that are capable of assimilation by the human eye. Conversely, it is also of prime importance not to admit unnecessary "stray" rays which are unassimilable to the human eye, and which cause irritation and eye strain when the result is viewed on the screen. Furthermore, the method of resorting to masks or various corrective means produces a very disagreeable flicker in the resulting picture when the same is projected on the screen.

One of the great disadvantages of the present methods of color photography wherein the film itself is coated with a dye is due to the fact that when the film so dyed is projected, the different dyes so used often clash with each other and produce a muddy effect in the half tones while the full tones are all exaggerated.

Most of the color processes now in use are not able to use a standard panchromatic film with goods results but require a special resensitization according to the curve of the filters used. This adds materially to the cost and serves to complicate the whole operation.

To overcome the difficulty of reproducing a record of color sensations of different degrees of intensity or frequency of vibration I have proceeded on the following theories. The red wave is of long undulation or slow frequency with a relatively long distance between crests but has greater actinic action on the panchromatic emulsion, a correspondingly greater transmitting power in projection under intense illumination onto the screen and a higher exponent of reflection from the red object. The green wave is of shorter undulation or higher frequency with a shorter distance between crests. It has a lesser actinic effect on the panchromatic emulsion, a lesser transmitting power in projection under intense illumination onto the screen and a lower exponent of reflection from the green object. The blue wave is of faster undulation and higher frequency than either the red or green wave, having greater actinic effect than green but not as great as red; a lesser transmitting power in projection under intense illumination than the green or red; and a higher exponent of reflection from the blue object than green, but not as high as red.

Having in mind the foregoing theories I have set out to assimilate, accord, tune, harmonize and distribute the different wave lengths or frequencies with their different characteristics, into a flow of vibration, in such a ratio, as to give a total amount of frequency which will not discord, and which will transmit truly and without assimilative or selective strain to the human eye the amount of vibration of each color necessary to reproduce a true color sensation of the object photographed.

I have discovered that this may be accomplished by toning the pigmentation as well as varying the area of the individual filters which make up the composite filter unit for each frame of the film so that the wave lengths of the individual filter units are in complete accord to the sensitivity curve of the panchromatic emulsion to produce a result which will correspond to the curve of intensity of stimulation or color assimilation of the human eye, for the actual object being photographed.

In this connection it must also be borne in mind that the colors of nature as registered by the human eye are not strictly pure colors. For instance, blue is formed by a full stimulus of the blue substance with a certain amount of green and a trace of red or yellow. To reproduce this effect to the eye a method must be used which will transmit to the panchromatic emulsion the correct proportions of these different refracted rays, which compose the natural colors.

These proportions must be evidenced by different degrees of density impressed in the panchromatic emulsion which, when transferred to the positive print are capable of recreating the color vibrations of the natural color.

The effects and desired results described above are obtained by exposing a given frame of panchromatic negative through a composite color filter unit made up of a group of one or more filter sections of different but related colors and one or more interposed or adjacent filter sections which are complementary to or on the opposite side of the spectrum from the said group of color filter sections; and exposing the succeeding frame of panchromatic negative through another composite color filter unit made up of a group of one or more filter sections of different but related colors complementary to or on the opposite side of the spectrum from the predominating colors of the filter sections of the first composite filter unit, and one or more interposed or adjacent filter sections which are complementary to or on the opposite side of the spectrum from the said group of color filter sections in the second composite filter unit.

The proportionate area and density (or degree of pigmentation) of the different color filter sections composing the two composite filter units is determined as described above and the effect on the panchromatic emulsion of subjecting the same frame successively to vibrations of a vastly different and contrary nature, arising from complementary filter sections of colors on opposite sides of the spectrum, is that the rate of flow of the actinic impacts of vibration is speeded up or slowed down over the same given time of exposure for each frame. To take a simple example, say that a blue is interposed between a red-orange and an orange-yellow in a composite filter unit. The effect of adding the blue, whose vibration is faster than the red-orange, is to accelerate the flow of vibration and at the same time reduce the strong actinic action of the red rays as considered over the time of exposure. Conversely assume that orange-red is interposed between a green and a blue-green. The effect of adding the orange-red, whose vibrations are slower than the green and blue-green is to retard the flow of vibration and at the same time intensify the lesser actinic action of the green rays and blue-green rays, as considered over the time of exposure. This serves to give an over-lapping and gradual absorption which gives harmony between frames and a complete variety of half-tones and at the same time a perfect balance of exposure. The fact that flicker and color pulsations are overcome is due to the fact that by my method, a negative is produced in which it is nearly impossible to see a difference between alternate frames of pictures and in which there is no over-correction in the color rendering. Balancing of exposure is accomplished by altering the rate of actinic impacts of opposite nature. This does not involve exaggeration of one color at the expense of another which is the result of other methods.

A substantiation of the statements made above appears in the fact that positive prints produced by this method gave an image with sharp outlines, true tone values and a remarkable stereoscopic effect with no eye strain when projected on the screen. The stereoscopic effect is due to perfect color tones in the shadows and the atmospheric effect reproduced on the screen. There is no eye strain because the unnecessary "stray" rays which are not assimilable by the human eye are eliminated.

By exposing the same frame of panchromatic negative through filters whose values are on opposite sides of the spectrum, sufficient exposure of each frame is secured in faint light from vibrations belonging to opposite sides of the spectrum because the filters intensify the actinic action of each of the different rays transmitted. Maximum transmission of light is secured because the filters are pigmented only to the lower limits of efficiency and the greatest possible time of exposure is utilized because no opaque masks are used to balance the exposure.

I have preferred to illustrate my improved method of taking pictures to be re-produced on a screen in colors by certain of the devices shown in the drawing. I preferably use a panchromatic film, as this film is sensitive to different color values between 4,000 and 7,000 Angstrom units. As a result color vibrations are recorded upon the negative film and are representative of different degrees of densities from opaque to almost a complete transparency of the emulsion when the different waves are passed through lenses and proper color filters.

My process or method of taking colored pictures resides principally in the following: I provide a device designated generally as A which is used in the taking of the colored pictures and which consists of a disc $a$ adapted to be placed behind or in front of the camera lenses $b$ and $c$, as shown in Figure 1, and such device is adapted to be rotated. This disc has thereon certain filter combinations, the principal segments having the following filter combinations,—orange red $d$, green $e$, and orange yellow $f$. The lower segmental filter combinations are green $e$, red $h$ and blue green $j$. It is to be noted that this disc also has a shutter portion $k$ which subtends an arc of approximately 180 degrees. It is noted that each of these filters on the said disc is in the form of a hollow sector and the inner sectors are slightly spaced from the outer sectors. In the present embodiment of the invention I have provided two lenses whereby two panels or frames of film may be photographed of the same scene at a time and through the said filters. To this end it will be necessary to change the mechanism of the camera to make this possible. However, the invention could be readily modified by providing the sectors $e$, $h$ and $j$ at the shutter portion $k$ and shorten the different lengths of sectors or degrees of arc subtended by each to provide segmental opaque portions or shutter portions between the two groups of filter combinations. This arrangement is shown in Fig. 2$^b$ of the drawings and generally designated A' wherein one sector or filter unit comprising the individual filter sections $e'$, $h'$ and $j'$ is arranged opposite to the filter unit or sector containing the individual filter sections $d''$, $e''$, and $f''$ with the segmental opaque shutter portions $k'$ lying therebetween. With this type of color filter and shutter it is only necessary to use one lens and the same can be readily adapted to standard camera construction. Whether or not the filter sections $e'$, $h'$ and $j'$ and $d''$, $e''$ and $f''$ are arranged at the same side of the diameter of the rotary shutter $a'$ or arranged in units or sectors of 90° diametrically opposite on the shutter merely depends on whether or not one or two lenses are used, or one or two frames of the negative are exposed at the same time. In each case successive frames are subjected to both filter units. In employing the type of shutter shown in Fig. 2$^b$ the same will rotate only half as fast as the rotary shutter shown in Fig. 2. I have found it an advantage under some conditions in my particular system of color photography to take two pictures at a time, as shown in Figure 1, because in fast action close to the camera the fringe effect is eliminated for the reason that the picture is taken in groups of two panels or frames, each panel of said group of two having an alternate color value with the action thereon identical; therefore there is no retard or advance of the action from the first to the second frame. I use the disc designated generally as B in Figure 4 in my projection machine. This disc is provided with sectors or segments containing colored filters, one group of which contains the segments $d$, $m$, $d$ consisting of orange red, violet and orange red, while a second group $n$, $m$ and $n$ is blue, violet and blue. These two groups are separated diametrically by two shutter portions 1 and 2. This particular disc is used with the projection machine C shown in Figure 3. It is to be noted that the disc B is mounted for rotation in front of the condenser 3, and that the strip film D, on which are pictures to be projected from such projecting machine, lies between the projecting lens mount 4 and such disc B. Adapted to be placed in front of the mount 4 is means E which is a shutter device adapted to synchronize the color values to overcome any flicker. This shutter device is adapted for rotation in front of the mount 4 and comprises three spaced sector portions 6, 7 and 8, which are equi-distantly spaced apart, the sides of which are serrated as shown at 9 so that the so-called shadow effect due to the rotation of the parts 6, 7 and 8 over a projected picture, will not be abrupt. Furthermore, the said sector portions are provided with cut-away portions designated generally as 10, and the size of these cut-away portions will depend upon use and service. For instance, the sector 7 has an enlarged cut-away portion 11 adapted to hold either some opaque medium or some colored material to supply any color that might be lacking in the picture projected. For instance, a yellow filter might be placed within the cut-away portion 11 to supply any yellow that might be needed. Assuming that we take two pictures at a time, the disc A is rotated rearwardly of the lenses $b$ and $c$ and in front of the film D and one panel or frame will have registered thereon a picture taken through the following filter, namely, orange red, green, orange yellow, while the lower panel will have registered thereon a picture taken through green, red, and blue green filters.

I have arranged the time or length of exposure for each individual section of each sector or filter unit over a given frame of film in accordance with the reflecting power of color vibrations of the object being photographed, and the multiplying factor or transmitting power of the filters, so that the resultant exposure for each color will be in such a ratio for the three filters that a correct color rendering will be obtained, together with a correct exposure, and likewise in such a manner that one color is not necessarily exaggerated at the expense of the other. Furthermore, and of prime importance is the fact that I provide in my filters either of the form shown in the projection machine or the form used in the taking of pictures, groups of filters, two of which are related or of like nature from a color standpoint, with an intermediate filter which is opposite or complementary to the other two filters on each side thereof. This will immediately be perceived upon inspection of Figure 2 wherein green is interposed between orange red, and orange yellow filters, the green being complementary to the orange red and orange yellow filters. This particular feature in my method of taking colored pictures allows me to obtain results not heretofore obtainable so far as I am aware, for the reason that the color complementary to the other two colors allows a not over-corrected or non-contrast picture to be taken for the reason that the center color section is complementary to the other two color sections which allows a non-contrast picture with full exposure, or in other words, a triple exposure of the colors are recorded which softens the general effect and gives more half tones. The result is so perfect that it is almost impossible to see a difference between the alternate frames of pictures, and this explains why flicker and pulsation is overcome in any movement from one color to another. This is particularly noticeable when an object is photographed through a red filter. The red is liable to be exaggerated and requires softening and to do this prior investigators in color photography have inserted opaque masks, as I have heretofore pointed out, or have cut slots in the filter, but this allows a space in the filter which cuts down the exposure and this renders the taking of pictures for colored photography purposes impractical except under the most favorable conditions, that is, in natural sunlight. Inspection of Fig. 2 will show that I have no opaque masks nor slots in the group of filters and that the sweep or the exposure of the frame to the groups of filters is continuous and that I soften the reds by a complementary filter, in other words, the red filter leads, the green filter follows to soften the effect of the first impression given by the red filter upon the film, and which green filter is further followed by another red filter. The same procedure would take place for the lower group of filters. This softening feature and allowing full time of exposure of the object to the film produces results wherein one color is not exaggerated at the expense of another. It will be observed that the disc B does not have filters thereon or colored segments which are identical with the filters of the disc A and for several reasons, namely, an arc light is used in the projection machine which transforms the colors, for instance, an arc light usually has a certain amount of yellow therein and when this yellow light is passed through blue the resultant projected color is a green. The violet color helps to correct the crudeness of the red. The group of colors of the disc B, namely, the blue, violet, and blue would act in conjunction with that panel of the film which was photographed through the filter combinations e, h and j, or, green, red and blue green. The group on the disc B containing orange red, violet, orange red, would act in conjunction with that panel of the film which was photographed through the filter group of the disc A containing orange red, green, orange yellow.

If desired one lens may be used, and in such a case the disc A would be changed so that the filter group e, h and j would lie in the same curved plane as the filter group d, e and f with shutter portions between such groups similar in detail to the arrangement of the filter groups of the disc B. The disc A would turn half a revolution for each panel of film and thus alternate discs would have registered thereon alternate effects due to the different filter groups. Where the action is close to the camera and very rapid such as in slow motion photography, it is preferable to use the two lenses b and c, as the color effects may be taken simultaneously on two panels and through two different groups of filters. However, in a projection machine the disc B would be turned one-half the speed of the disc A, as would be obvious. The arrangement of the different filter groups having two related colors with an interposed complementary color allows me to temper, increase, balance or correct the crude transmission of color values transmitted by the ordinary filters. I do not wish to limit myself to the use of the particular colored filters designated, as I may readily use other combinations as long as one of the filters is complementary to the other two filters. Also I have found that I may use but two filters to each group, the filters being complementary. For instance, referring to the disc A I would use the filters d and e for one group and the filters e and h for the second group, the results being approximately the same. Furthermore, it is evident that the degree of arc subtended by the different filter groups of the disc B will depend upon the amount of correction that may be necessary to correct colors in the projected picture. The same is true for the disc A, wherein certain of the filters may be enlarged or diminished as to size to correct various deficiencies in colors. For instance, for a photograph of a mountain or the ocean, it is necessary to use more green than red.

Referring to Figures 2 and 6, if the film shown in Figure 6 were used in conjunction with two lenses, one above the other, and the said film run sideways past the said two lenses, the said disc A being interposed between the lenses and the film, it would be possible to take two pictures through different groups of filters and on one panel, as indicated by 20 and 21, the line of division being indicated as 22. In this case the lenses would have to be adjusted so as to divide the space upon the single panel. This method would of course save film.

Any form of panchromatic emulsion now on the market can be used with my process of taking colored pictures, as I can readily vary the exposure of the same in the same manner as is universally done at the present time by camera men.

It is not to be understood that I project two panels at a time, but rather one panel at a time is projected through the projecting machine C.

In the showing of Figure 2 I have illustrated a certain arrangement of the different filter groups which produces good results under ordinary conditions and wherein, assuming 180 degrees of arc for each filter group, the filters d and e of the upper and lower groups would subtend an arc of 90 degrees, the filters e and h of the upper and lower groups 27 degrees, and the filters f and j 63 degrees. Considered in a different manner and on a 100 point scale for upper and lower like groups the filters d and e would be 50 per cent or 50 points, the filters e and h 15 points or 15 per cent, and the filters f and j 35 points or 35 per cent. This percentage would not necessarily hold for the filter groups of the disc B, and for the reasons that have heretofore been set forth, namely, because of correction for certain colors when projected.

In conclusion it will be apparent that by the use of my system of color filters with the component parts arranged substantially as specified hereinbefore, each film area is exposed in the taking of the pictures to an optical mixture of colors which run from one side or one end of the spectrum band of color values to the other side or end with a fusion of these color values. By employing a secondary filter unit which is complementary to the first color unit for a succeeding film area, there is a peculiar blending and toning of the various colors not heretofore produced by any known system of employing color filters by an optical mixture. As an example of the optical mixture referred to, it will be noted that when the color unit, for example, shown in Fig. 2b is moved in front of the film area, the first major section is red which is taken from one side or the extreme end of the spectrum band. The next section of the unit to affect the film is the violet section which is taken from the opposite end of the spectrum band and acts to properly tone down the red of the preceding section. The third section is the yellow which is from the same side of the spectrum band as the red but located more toward the center. When a full sweep is made of these three colors, therefore, there is a color mixture which I term an "optical" mixture not only of the three colors but of the colors which run from one extreme of the spectrum band to the other and including the intermediates to the point of location of the yellow. These colors, because of the values expressed by the areas of the component parts of the filter unit, are blended into a fusion band so-called. When, now, the second unit passes the film of the next film area, the dominating red color of the first unit is affected by a fusion band of colors having the characteristics of the first mentioned unit but with a dominating color complementary to the dominating red of the first unit mentioned. The persistency of color of these two fusion bands is carried from one to the other without the flicker usually found in the use of color filters employing sharp untoned and unblended color values.

Having thus disclosed my invention, I claim and desire to secure by Letters Patent:

1. A method of registering color vibrations on a film sensitive to all colors of the visible spectrum which consists in exposing each frame of the film to an admixture of color vibrations resulting from the action of light passing through a composite filter comprising major filter sections whose color vibrations are approximately of the same wave length, one of such major sections being disposed at each end of the filter, and an intermediate filter of a toning color having a different actinic value, less total exposure, and a different color wave length from said major filters.

2. A method of registering color vibrations on a film sensitive to all colors of the visible spectrum which consists in exposing each frame of said film to the action of light passing through a composite filter unit comprising a plurality of major and minor color filter sections of different total exposure and whose color vibrations are of different wave lengths, said sections being arranged so that three different color vibrations of different actinic value and wave length are registered on the same area in a succession of a major section, then a minor section and finally a second major section.

3. A method of taking motion pictures in color which consists in exposing each frame of a panchromatic film through a composite filter unit comprising two color filter sections whose color vibrations are of different wave lengths and on the same side of the spectrum having slightly different actinic value and slightly different wave length and respectively covering approximately 50% and 35% of the composite filter area and also including another filter section having an area of approximately 15% of the composite filter area and being of a color of greatly different actinic value and a greatly different wave length from the other color filter sections.

4. A motion picture apparatus including a combined shutter of opaque portions and color filter screens in which each image area filter section comprises major color sections whose color vibrations are of approximately the same wave length and on the same side of the spectrum and an interposed complementary toning color section from the opposite side of the spectrum and whose color vibration is of a greatly different wave length from the major color sections.

5. A motion picture apparatus including a combined shutter of opaque portions and color filter units in which each image area filter section comprises major color filters whose color values are from the same side of the spectrum and whose color vibrations are of different wave lengths and an interposed color filter from the opposite side of the spectrum, the effective color vibrations of said latter filter being less than that of the major filters.

6. A motion picture apparatus including a combined shutter of opaque portions and color filters comprising two color units each having major filters whose color values are from the same side of the spectrum but whose color vibrations are of different wave lengths and an interposed filter from the opposite side of the spectrum whose effective color vibration is less than that of the major filters whereby successive frames of the negative film will be impressed with a blended color mixture.

7. A method of taking motion pictures in color which consists in subjecting successive frames of panchromatic film to the action of light through two composite filter units, each color unit including principal color filters and an intermediate toning color filter, the principal color filters having approximately the same wave length and being on the opposite side of the spectrum from the said principal colors of the other of said units, and the intermediate toning color filter of each unit being of the opposite side of the spectrum from the adjacent principal color filters and of greatly different wave length.

8. The method of taking pictures which consists in exposing successive frames of a film sensitive to all colors of the visible spectrum to the action of light passing through filter units each comprising two filters having colors on the same side of the spectrum and of approximately the same wave length, and an interposed filter having a color from the opposite side of the spectrum and of greatly different wave length from the main adjacent filters.

9. A method of taking colored motion pictures which consists in subjecting one frame of a negative sensitive to all of the colors of the visible spectrum to light through a composite filter unit consisting of a plurality of individual filter sections of different wave lengths on the same side of the spectrum and an interposed complementary filter section having a color from the opposite side of the spectrum and of greatly different wave length from the adjacent filters, and subjecting the succeeding frame of the negative to another composite filter unit containing an arrangement of filter sections similar to said arrangement of filters in the first named unit, but the predominating effective wave length in each unit being on opposite sides of the spectrum.

10. A method of registering different components of the spectrum on a film sensitized to the spectrum which consists in transmitting to said film by the action of light reflected from the object passing through a composite filter unit including filter sections of approximately the same wave length and forming the major area of each unit, and another filter of less effective wave length than the major filter sections on either side thereof and of greatly different wave length from the wave lengths of the major filter sections but complementary thereto.

11. A method of registering color vibrations on a film sensitive to all colors of the visible spectrum which consists in exposing successive frames of the film to the action of light passing through separate different composite filter units each comprising a plurality of major color filters respectively of different wave lengths and a toning color filter having a different actinic value less total exposure, and a different wave length from the immediately adjacent color filters respectively on opposite sides thereof, the wave lengths of the filters of predominant area being different and from opposite sides of the spectrum thereby to register predominating colors in successive frames on opposite sides of the spectrum.

12. A process for taking colored motion pictures which consists in limiting the light rays acting upon each one of a plurality of successive image areas of a film successively to three different colors, the total color effect in each image area being the result of two colors from the same side of the spectrum and an intermediate color from the opposite side of the spectrum, and the predominating total color effect in succeeding image areas being on opposite sides of the spectrum.

13. In cinematography the process consisting in limiting the light rays acting upon each alternate one of a plurality of successive image areas of a film successively to a different set of a plurality of colors, the total predominating color effect of one set of a plurality of colors being on the opposite side of the spectrum from the total predominating color effect of the other set of a plurality of colors, and the said predominating total color effect in each image area being tempered by a color from the opposite side of the spectrum.

14. In the art of color photography, the step which comprises limiting the light rays acting upon each image area to a plurality of spectrum color values composed of independent different non-complementary color values at the extremes with only complementary color therebetween capable of producing an optical mixture of spectrum color values running from one side of the spectrum to the other.

15. In the art of color photography, the process consisting in limiting the light rays acting upon an image area to a plurality of spectrum color values composed of non-complementary and complementary spectrum color values capable of producing an optical mixture running from one side of the spectrum to the other, and limiting the following image area to a different colored spectrum value in harmony with and complementary to the first mentioned values.

16. In the art of color photography, the process consisting in limiting the light rays acting upon an image area to a plurality of spectrum color values composed of non-complementary and complementary spectrum color values capable of producing an optical mixture running from one side of the spectrum to the other, and limiting the following image area to colored spectrum values capable of producing an optical mixture running in the reverse order of the spectrum to that of the first mentioned.

17. In the art of color photography, the process consisting in limiting the light rays acting upon an image area to a plurality of spectrum color values composed of non-complementary and complementary spectrum color values capable of producing an optical mixture running from one side of the spectrum to the other, and limiting the light rays acting upon the following image area rays acting upon the following image area to similarly composed spectrum color values capable of producing an optical mixture running in the reverse order of the spectrum to that of the first mentioned.

18. In the art of color photography, the process consisting of limiting the light rays acting upon an image area to a plurality of spectrum color values, the extreme color values of which are different definite portions of the spectrum at one side and the intermediate color value of which is a complementary color from the other side, and limiting the following image area to similarly composed color values, the extreme and intermediate color values of which are from the opposite side of the spectrum from the corresponding ones of the first plurality mentioned and producing a total color sensation complementary to that of the first plurality.

19. In the art of color photography, the process consisting of limiting the light rays acting upon an image area to a plurality of spectrum color values, the extreme color values of which are different definite portions of the spectrum at one side and the intermediate color value of which is a complementary color from the other side, and limiting the following image area to similarly composed color values, the extreme and intermediate color values of which are from the opposite side of the spectrum from the corresponding ones of the first mentioned plurality, the total summation of said values equaling substantially all spectrum values, and the second plurality of values producing a total color sensation complementary to that of the first plurality.

20. In the art of color photography, the process consisting of limiting the light rays acting upon an image area to a plurality of spectrum color values, the extreme color values of which are different definite portions of the spectrum at one side and the intermediate color value of which is a complementary color from the other side, and limiting the following image area to similarly composed color values, the extreme color values of which are approximately from points in the spectrum between the extremes and intermediate color values of the first mentioned plurality.

21. In the art of color photography, the process consisting of limiting the light rays acting upon an image area to a plurality of spectrum color values, the extreme color values of which are different definite portions of the spectrum at one side and the intermediate color value of which is a complementary color from the other side, and limiting the following image area to similarly composed color values, the extreme color values of which are approximately from points in the spectrum between the extremes and intermediate color values of the first mentioned plurality, the color predominance of the respective pluralities being complementary.

22. In the art of color photography, the process consisting in limiting the light rays acting upon an image area to a series of noncomplementary and complementary spectrum values and a following area to a second series so combined as to run approximately from one side of the spectrum to the other, whereby the optical persistency of color of the first series will combine with the persistency of the second series and furnish all the spectrum values.

23. In the art of color photography, the step which comprises limiting the light rays acting upon successive image areas of a panchromatic film to a plurality of at least three irregular and alternately complementary spectrum color values successively acting one color at a time, the first and third color values being different and non-complementary and of greater exposure area.

24. As a new article of manufacture, a color filter composed of different noncomplementary spectrum values, and an interposed complementary spectrum value in harmony therewith and of different wave length and exposure area, said spectrum values being arranged in the order of sequence for consecutively sweeping the image area of a film.

25. As a new article of manufacture, a color filter composed of a filter unit comprising noncomplementary and interposed complementary spectrum values, and a second unit complementary to the first unit.

26. As a new article of manufacture, a color filter composed of a filter unit comprising noncomplementary and interposed complementary spectrum values, and a second unit comprising a series of noncomplementary and complementary spectrum values, the optical mixture of which is complementary to the optical mixture of the first unit.

27. As a new article of manufacture, a color filter composed of a filter unit comprising major noncomplementary and interposed minor complementary spectrum values, and a second unit including a major color value complementary to the major color value of the first unit.

In testimony whereof, I have signed my name to this specification.

MAX B. DU PONT.